(12) United States Patent
Swearingen et al.

(10) Patent No.: US 8,210,773 B2
(45) Date of Patent: Jul. 3, 2012

(54) PROCESS FOR INSITU TREATMENT OF SOIL AND GROUNDWATER

(75) Inventors: Jason Swearingen, Sellersburg, IN (US); Lindsay Swearingen, Sellersburg, IN (US)

(73) Assignee: Specialty Earth Sciences, New Albany, IN (US)

( * ) Notice: Subject to any disclaimer, the term of this patent is extended or adjusted under 35 U.S.C. 154(b) by 374 days.

(21) Appl. No.: 12/706,087

(22) Filed: Feb. 16, 2010

(65) Prior Publication Data

US 2011/0198071 A1 Aug. 18, 2011

(51) Int. Cl.
*B09B 1/00* (2006.01)
(52) U.S. Cl. .................................................. 405/129.65
(58) Field of Classification Search .............. 405/129.65
See application file for complete search history.

(56) References Cited

U.S. PATENT DOCUMENTS

| | | | |
|---|---|---|---|
| 4,400,271 A | 8/1983 | Lunceford | |
| 5,002,431 A * | 3/1991 | Heymans et al. | 405/129.6 |
| 5,560,737 A | 10/1996 | Schuring et al. | |
| 5,733,067 A | 3/1998 | Hunt et al. | |
| 5,753,109 A | 5/1998 | Looney et al. | |
| 5,789,649 A * | 8/1998 | Batchelor et al. | 405/128.5 |
| 5,816,748 A | 10/1998 | Kleiser et al. | |
| 5,916,441 A | 6/1999 | Raether | |
| 5,944,446 A | 8/1999 | Hocking | |
| 5,975,798 A | 11/1999 | Liskowitz et al. | |
| 6,210,955 B1 | 4/2001 | Hayes | |
| 6,357,968 B1 * | 3/2002 | Dwyer et al. | 405/269 |
| 6,422,318 B1 | 7/2002 | Rider | |
| 6,428,695 B1 | 8/2002 | Naftz et al. | |
| 6,457,905 B1 | 10/2002 | Nickell | |
| 6,726,406 B2 | 4/2004 | Gilmore et al. | |
| 7,141,173 B2 | 11/2006 | Bethke | |
| 2001/0033772 A1 * | 10/2001 | Gilmore et al. | 405/128.75 |
| 2006/0239778 A1 * | 10/2006 | Nickelson et al. | 405/129.8 |
| 2008/0314593 A1 | 12/2008 | Vinegar et al. | |

* cited by examiner

*Primary Examiner* — John Kreck
(74) *Attorney, Agent, or Firm* — Witters & Associates; Steve Witters

(57) ABSTRACT

A process for insitu treatment of at least one contaminant in a groundwater plume, the process comprises the steps of: installing a permeable reactive barrier in the flow path of the groundwater plume, wherein the installation of the permeable reactive barrier comprises the steps of: boring a first borehole with a portion longitudinally extending substantially parallel with an upper surface of the groundwater plume; filling the longitudinally extending portion of the first borehole with a reactive material comprising a solid reactant configured to react with the at least one contaminant in the groundwater plume to produce at least one product having less hazardous characteristics than the at least one contaminant; boring a second borehole with a portion proximate, substantially adjacent or overlapping the longitudinally extending portion of the first borehole; and filling the portion of the second borehole proximate, substantially adjacent or overlapping the longitudinally extending portion of the first borehole, with the reactive material.

14 Claims, 2 Drawing Sheets

PROCESS FOR INSITU TREATMENT OF SOIL AND GROUNDWATER

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

The present invention relates to methods for insitu treatment of soil and groundwater, more specifically towards methods of treatment including permeable reactive barriers and solid reactants.

BACKGROUND OF THE INVENTION

Discharges of hazardous organic compounds into the environment have led to contamination of surface water, soil, and aquifers resulting in potential public health problems and degradation of the land for future use. As used in this specification and appended claims, hazardous organic compound means a chemical or substance that is either toxic or highly toxic, an irritant, corrosive, a strong oxidizer, a strong reducer, a strong sensitizer, combustible, either flammable or extremely flammable, dangerously reactive, pyrophoric, pressure-generating, a compressed gas, a carcinogen, a teratogen, a mutagen, a reproductive toxic agent, or is suspected of having adverse health effects on humans. In many cases, subsurface groundwater contaminant plumes may extend hundreds to thousands of feet from the source area of a chemical release resulting in extensive contamination. These chemical contaminants may then be transported into drinking water sources, lakes, rivers, and even basements of homes.

The U.S. Environmental Protection Agency (USEPA) has established maximum concentration limits (MCL's) for various hazardous organic and inorganic compounds in water and soils. For instance, stringent drinking water limits placed on many solvent organic compounds in water can be as low as 0.005 mg/L (parts per billion).

The presence of hazardous compounds in subsurface soils, surface water, and groundwater is a well-documented and extensive problem. The source of these hazardous materials is often times from industry where the materials are released onto the soil surface or surface water or even into the subsurface soil and/or groundwater through leaking storage tanks. Many, if not most, of these compounds are capable of moving through the soil under the influence of moving water, gravity, or capillary action and serve as a source of groundwater contamination. As used in this specification and appended claims, soil is to be interpreted broadly to include all naturally occurring material found below ground surface (e.g. silts, clays, sands, rock, karsts, organics, tills, etc.).

Soil, surface water, groundwater, and wastewater can become contaminated by a variety of substances. The substances include, without limitation, metals, volatile, semi-volatile, and non-volatile organic compounds. Common examples of such contaminates include arsenic, barium, cadmium, chromium, lead, mercury, selenium, silver, PCBs, gasoline, oils, wood preservative wastes, and other hazardous organic compounds. Such other hazardous organic compounds may include, but not limited to, chlorinated solvents (such as trichloroethylene (TCE), vinyl chloride, tetrachloroethylene (PCE), and dichloroethanes), ethylene dibromide, halobenzenes, polychlorinated biphenyls, acetone, ter-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc).

Contaminated soil and groundwater must be removed or treated to make it less toxic and to meet USEPA requirements. There are a variety of reactants and methods for treating contaminated soil, surface water, groundwater, and wastewater as discussed below.

Peroxydisulfate's have been reported as applied constituents for organic carbon digestion or decomposition. Application methods include thermally activated persulfate oxidation in conjunction with an electro-osmosis system to heat and transport persulfate anions into soils.

Permanganate(s) and peroxygen(s) reactant(s) have also been reported as applied constituents for oxidation of organic compounds. Peroxygen compound(s) applied independently or in conjunction with a metallic salt catalyst(s) (complexed and not complexed; chelated and not chelated) have been shown to break down organic compounds within the soil, groundwater, and wastewater.

Groundwater and subsurface soil typically has been treated by injecting reactant(s), with or without a catalyst(s), within an aqueous mixture, slurry, or suspension into the subsurface. Injection into the subsurface is accomplished by gravity feed or the use of a pump(s) to increase well head pressure. This results in the subsurface dispersion of the reactant(s) within the area of the injection well.

Another method for in situ treatment of groundwater includes the excavation of a trench proximate or downstream of a subsurface plume of organic and/or inorganic contaminant(s). The trench is filled with reactant(s) and a permeable media(s) (i.e. sand) for the plume to flow through, subsequently reacting oxidizable and/or reducable organic and/or inorganic compounds that come into contact with the reactant(s). These trenches filled with a reactant are often referred to as permeable reactive barriers (PRBs). One limiting factor in current methods of installing PRBs is that structures, roads, or other improvements to the land above the installation site may need to be destroyed when digging the trench. Alternatively, the trench may need to be located further down flow of the plume of contamination than desired, to avoid destruction of improvements to the land nearer the plume of contamination. Other limiting factors may include a requirement for heavy equipment and the need to move the heavy equipment across the land to excavate the trench which may be destructive or detrimental to the ground. Additionally, current methods for installing PRBs may require disposal of large volumes of cuttings or soils removed to form a trench. These removed cuttings or soils may be hazardous which may increase health and safety requirements and disposal costs.

The methods used for ex situ treatment or in situ treatment of surface contamination, water or soil, typically involve the direct application of the reactant(s) to the hazardous organic compound(s). In the case of ex situ surface soil treatment, the soil is often times mixed or tilled to ensure contact of the reactant(s) with the hazardous organic compound(s).

Meeting USEPA cleanup criteria with these reactants and methods of the prior art has been found to be difficult, costly, and even impossible. With some of these current methods and reactants, there has been questionable showing that their application results in the effective or efficient removal of contaminants.

Current methods involving the use of peroxide group(s) (i.e. hydrogen peroxide) in conjunction with iron salt catalyst(s) have shown to be relatively inefficient, often resulting in incomplete contaminant oxidation. Hydrogen peroxide in particular has been found to lack persistence in contaminated soils and groundwater due to rapid dissociation. Many of these current employed reactants are hazardous and difficult to handle.

Recently, the use of permanganate(s) has been found to be an effective oxidizing agent of certain hazardous organic compound(s). However, known methods to use that ability to actually remediate a site requires exceedingly large quantities of permanganate(s) to overcome the natural oxidant demand exerted by the soil, thereby limiting the percentage available for oxidizing the hazardous organic compound(s). Large amounts of permanganate(s) may thus be required per unit of soil and groundwater volume, limiting the application of this technology due to high cost. Additionally, a product of the permanganate(s) oxidation reaction is solid manganese dioxide, which may precipitate and clog the soil or aquifer, resulting in a reduced permeability of the soil to water. This clogging may reduce the hydraulic conductivity of the soil and thereby inhibit oxidant access to the entire contaminated site, rendering treatment of the soil and the groundwater plume flowing therethrough, incomplete.

Because of these limitations of the art before the present invention, there is a need for improved methods of insitu treatment of soil and groundwater contamination.

SUMMARY OF THE INVENTION

One aspect of the present disclosure provides a process for insitu treatment of at least one contaminant in a groundwater plume comprising the steps of: 1) installing a permeable reactive barrier in the flow path of the groundwater plume, wherein the installation of the permeable reactive barrier comprises the steps of: a) boring a first borehole with a portion longitudinally extending substantially parallel with an upper surface of the groundwater plume; b) filling the longitudinally extending portion of the first borehole with a reactive material comprising a solid reactant configured to react with the at least one contaminant in the groundwater plume to produce at least one product having less hazardous characteristics than the at least one contaminant; c) boring a second borehole with a portion substantially adjacent or overlapping the longitudinally extending portion of the first borehole; and d) filling the portion of the second borehole substantially adjacent the longitudinally extending portion of the first borehole with the reactive material; 2) passing at least a portion of the groundwater plume having the at least one contaminant through a portion of the permeable reactive barrier; and 3) reacting at least a portion of the at least one contaminant with a portion of the permeable reactive barrier to produce at least one product having less hazardous characteristics than the at least one contaminant.

DETAILED DESCRIPTION OF THE INVENTION

Figure 1:
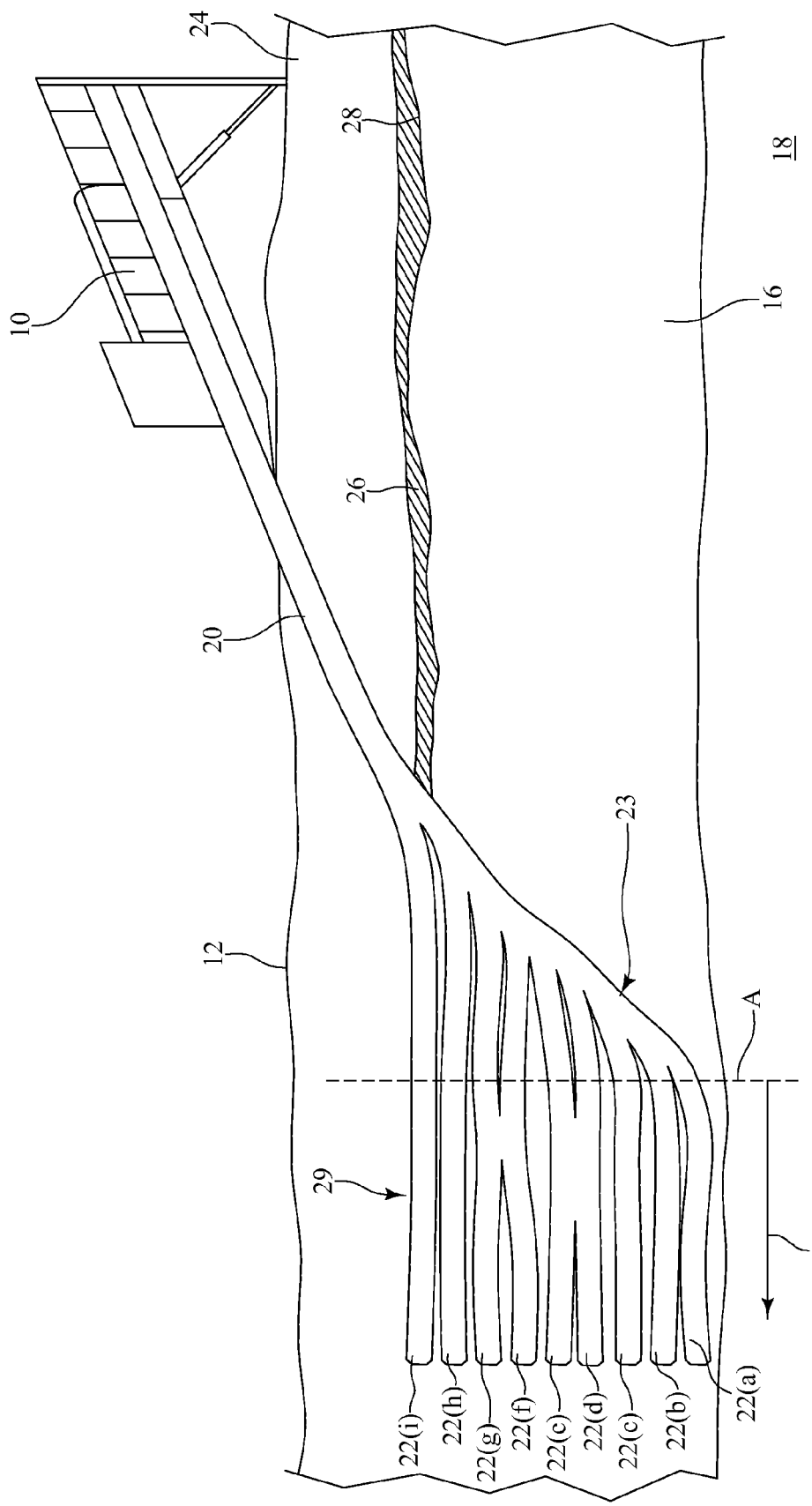
FIG. 1 is a cross-sectional view of a PRB installed by the method disclosed herein.

The present invention provides a method for the insitu treatment of contaminated groundwater and soil with solid environmental reactant(s).

Aspects of the present disclosure provide a method for the installation of PRBs without the need for trenching. Directional boring may be used when trenching or excavating is not practical or cost effective. For example, when there are improvements to the land above the leading edge of a contaminated groundwater plume it may be advantageous to install a PRB with directional drilling rather than trenching. Directional boring, directional drilling, or horizontal directional drilling (HDD), may minimize disruption to the surface environment since no open trench is created and heavy equipment may not be required to move across the land. A directional drill may be suitable for a variety of soil conditions and jobs including installing a PRB under a road or structure. Boreholes in excess of a mile long may be installed and/or diameters up to 56 inches may be obtained.

Directional boring, commonly called horizontal directional drilling or HDD, is a steerable trenchless method of making a borehole. Directional drilling is commonly used for the installation of underground pipes, conduits and cables. Typically, the borehole is in the form of a shallow arc proximate a prescribed bore path. A surface launched drilling rig, with minimal impact on the surrounding area, may be used. For example, horizontal directional drills manufactured by Vermeer of Pella, Iowa, and directional drills manufactured by DitchWitch® of Perry, Okla., may be used for the installation of PRBs of the instant disclosure.

The use of directional drilling methods for the installation of PRBs may provide less traffic disruption, lower cost, deeper and/or longer installation, shorter completion times, directional capabilities, and increased environmental safety, and less hazardous waste produced for disposal, as compared to current trenching methods. Additionally, in at least one embodiment of the present disclosure, no access pit is required as the directional drill rig may be placed on the soil surface. In another aspect of the present disclosure, a small access pit and receiving pit may be provided.

The installation of a borehole for the installation of a PRB may include several steps with a first step including drilling a first hole or pilot hole on the desired path, which may have a portion proximate an upper or lower surface of the groundwater table, just down flow of a plume of contamination. A second step of enlarging the borehole by passing a larger cutting tool or back reamer through the pilot hole may be taken if the pilot or first hole lacks the desired diameter. A third step may include placing or inserting a tube or pipe configured to permit flow of water through a circumferential surface thereof. The tube or pipe may be porous or otherwise permeable, such as tubing or pipe having perforations, slots, or other openings therein configured to provide the flow of water through the side of the tubes or pipes. The tubes or pipes may be comprised of materials such as PVC, HDPE, polyethylene, ductile iron, copper, and steel. Advantageously, the tubes or pipes may be flexible, bendable or malleable so that they can be inserted into a curved borehole. Optionally, a tube or pipe may comprise a solid reactant therein. The tubes or pipes may be pulled or pushed into the borehole. A fourth step may comprise placing a solid reactant into the permeable pipe or borehole. In some aspects of the present disclosure, the second step of enlarging the borehole and/or the third step of placing a permeable pipe into the borehole may not be necessary. This may be because the first borehole may have a desired diameter and/or the solid reactant may maintain the integrity of the borehole or perhaps the borehole may be permitted to collapse. For example, the reactant may be placed directly into the borehole without a tube or pipe. Additionally, the reactant may be fed into the borehole during drilling or after drilling the borehole.

The directional control capabilities of directional drilling may provide for making changes in the directions of the drilling head. For example, a pilot borehole may be made by starting perpendicular to the surface, at 45° with the surface, at 30° with the surface, or at another desired angle with the surface, and curved or arced to a desired angle, typically substantially parallel with the groundwater table.

Several means may be used in directing the boreholes during drilling or boring. For example, a sonde or transmitter may be located behind the bore head or drill bit and configured to register angle, rotation, direction and temperature data, for example. This information may then be encoded into an electro-magnetic signal and transmitted through the ground to the surface in a walk-over system. At the surface a receiver (usually a hand-held 'locator') may be manually positioned over the sonde, the signal decoded and steering directions may then be relayed to a bore machine operator. In a wireline system, this information may be transmitted through a cable fitted within the drill string.

The directional drilling rig may be set in a bore pit or up on the ground surface. A pilot borehole may be started by pushing a drill rod through the ground at a shallow angle such as 45°, 30°, 20°, 10°, or steeper or shallower, in one degree increments such as approximately 12°. When the drill head reaches the desired depth, the bore head may be steered along a sag shaped curve or arc until it levels out. This may begin a portion of the borehole that longitudinally extends substantial parallel with an upper surface of the groundwater plume. Upon obtaining the desired angle of the borehole, drilling or boring may be continued, typically substantially parallel with an upper surface of the groundwater plume, until the desired length is achieved, e.g. the desired length of the PRB. Upon reaching the desired length, the drill head may be extracted by backing out of the borehole or steered to a receiving pit. Optionally, the drill head may be steered upward through a sag shaped curve to exit the ground at the surface.

Directional drilling is a boring method which can be remotely steered. This may be accomplished through the use of a slanted, or anvil shaped device, often called a duckbill. The duckbill attaches to the front of the drill head. The angle of the duckbill causes the drill head to move along a curved path. In order to change the direction of the bore, the drill stem and duckbill may be rotated to a position causing the bore to move in the desired direction. To bore in a straight line, the drill stem and duckbill may be rotated continuously as the bore is advanced. For larger diameter bores, the duckbill may be replaced with a section of slightly bent or curved pipe called a bent sub. A bent sub typically comprises a short cylinder installed in the drill stem between the lowest drill collar and the downhole drill head and is configured to deflect the drill head from vertical in order to drill a directional hole. The bent sub may provide the same purpose and effect as the duckbill.

In order to steer a bore around obstacles or form a desired shape of the PRB, the operator must know the location of the borehead and the direction it is traveling. This information is provided through the various tracking systems that are available. The most common method is a "walk-over" system. A radio transmitter or "sonde" is located directly behind the bore head and transmits a signal. A receiver, similar to those used by utility companies to detect underground pipes or cables, may be used to determine the location and depth of the borehead. The drawback of the walkover system is that it may be difficult to gain access to the area directly above the bore head (i.e. for water crossings, or bores under buildings). There are also "hardwire" tracking systems available. These systems relay information such as head location, depth, and inclination and orientation of the head back to a computer. Based upon this information, the operator can make any necessary adjustments to keep the bore on the desired alignment. For small diameter bores, the reactant or slurry containing the reactant may be fed into the borehole while retracting the bore head or after retracting the bore head from the borehole. Optionally, a tube or pipe containing a reactant and configured to permit flow of water through a circumferential surface thereof, may be pulled back through the pilot hole with no additional enlargement of the hole required.

If a larger diameter borehole is desired, the pilot hole may be back reamed. Back reaming may be accomplished by removing the drill head and attaching a back reamer to the drill string. The back reamer serves two functions. The first and most obvious is to enlarge the diameter of the borehole to a desired size. The size of the borehole may be larger than the diameter of a slotted or perforated tube or pipe to be installed, such as about 1½ times the diameter of the tube. The second function of the reamer is to mix the soil cuttings with the drilling fluids to create a slurry. The reamer is rotated and pulled back through the pilot hole, thereby cutting the soil and increasing the diameter of the bore. At the same time, drilling fluid is pumped through the drill string to the reamer. The cuttings mix with the drilling fluid, forming a slurry. Some of this slurry may be forced out of the bore hole, into a receiving pit. However, most of the slurry may remain in place to support the borehole, and keep it from collapsing. A reactant may be added to the slurry, advantageously upon reaching a desired diameter, and forced into the borehole. Optionally, a slotted, perforated, screened, or otherwise permeable tube or pipe may be laid out in-line with the bore and pulled into place. As it is pulled into place, a volume of slurry may be forced out of the borehole. A volume of slurry may remain between the outside of the tube or pipe and the inside of the reamed borehole providing support to the borehole. The tube or pipe may be packed with a reactant or the reactant may be forced into the tube or pipe after installed into the borehole.

In at least one embodiment of the present disclosure, pre-packed lengths of porous tubing are joined together and fed into the borehole. For example, lengths of porous tubing packed with at least one solid reactant may be provided to aid in installation. The lengths of tubing or pipe may be flexible (e.g. corrugated drainage pipe) or inflexible. The lengths of tubing may have threaded ends for screwing together or may be joined with a flexible coupling such as a Fernco boot, manufactured by Fernco Inc., Davison, Mich., for example. The lengths of tubing may be joined by other methods as are known in the art, such as plastic welding or fusing of HDPE. In at least one aspect of the present disclosure, lengths of pre-pack tubing are joined together upon feeding or inserting into the borehole. In another aspect, the lengths of tubing are not joined but may remain adjacent, end to end, in the borehole.

In at least one aspect of the present disclosure, pre-packed screened, slotted, or otherwise porous pipe may be pre-engineered with the correct well screens, reactant size and concentration, and sand mix. The pre-packed screened pipes may have relatively short lengths, such as 4-6 feet, for example, such that they can be pulled back through the borehole and the end of one section of pipe may be attached to the beginning of the next section in series. This may allow the packing and design of the porous or screened pipe to be done in advance. These pre-engineered lengths of tubing or pipe may provide for shorter lengths of packed pipe that are easier to transport, handle, and install into the boreholes.

The pilot borehole may also be enlarged by using slurry drilling methods. Slurry methods may involve the use of a drilling fluid, such as water or a slurry comprising clay based materials such as bentonite, for example, to aid in the drilling process and soil removal. Slurry methods can be divided into two classifications: slurry boring and water jetting. Slurry boring normally begins by constructing a bore pit. The boring machine is set in the pit and adjusted to the appropriate line and grade. A pilot hole may be formed by the directional drilling methods previously disclosed or by advancing drill tubing, with a drill bit attached to the end, through the ground. As the bit is advanced, drilling fluid is pumped through the tubing to the drill bit in order to lubricate the pilot drill and reduce the friction created by the advancing bore. Once the pilot bore reaches the receiving pit, a back reamer can be pulled or a forward reamer can be pushed through the ground to increase the bore to the required diameter.

As the reamer is forced through the ground, drilling fluid is pumped into the bore. Depending on soil type, this drilling fluid comprises water and may further comprise one or more additives or other materials such as clay materials. For example, the drilling fluid may comprise a mixture of water and bentonite. Optionally, the drilling fluid may contain a reactant. The soil is mechanically cut by the reamer and mixed with the drilling fluid. These cuttings are held in suspension forming a slurry. This slurry helps prevent the uncased borehole from collapsing by exerting hydrostatic pressure against the walls of the bore.

After the reaming process is completed, a reactant may be added to the slurry and forced into the borehole. Optionally, a slotted, perforated, or otherwise porous or permeable tube or pipe may be pulled into place. The tube or pipe may be packed with a reactant or the reactant may be forced into the tube or pipe after installed into the borehole. In at least one aspect, pre-engineered lengths of porous pipe containing at least one solid reactant are joined together upon installing into the boreholes.

Another method of forming a borehole is the water jetting method. Water jetting relies on a high speed jet of water to liquify and remove soil. A special nozzle may be attached to the end of a rod and extended forward into a pilot hole. Advantageously, a pilot borehole is first made with a directional drill as disclosed. The jet of high-pressure water is used to perform all of the cutting and to wash the cuttings out of the bore.

Horizontal directional drilling may be done with a drilling fluid. Drilling fluid may be comprised of a mixture of water, polymer(s), clay material(s), such as bentonite, and/or other additives. The drilling fluid may comprise a solid reactant for inserting into the plurality of boreholes to form the PRB. In this aspect of the present disclosure, the completion of the drilling step may be all that is needed to make a borehole having a reactant. The drilling fluid may be continuously pumped to the cutting head or drill bit to facilitate the removal of cuttings, stabilize the bore hole, cool the cutting head, lubricate the passage of a porous tube or pipe, or deliver the solid reactant into the borehole.

Drilling fluids may be configured to stabilize the borehole, which may mitigate hydro-fracturing and allow a porous tube or porous tube packed with solid reactant to be pulled-in more easily. The proper mix of drilling fluids may be determined by the soil conditions and characteristics of the water mixed with the drilling fluid and the reactant in the drilling fluid, if any. Geotechnical information may be gathered in advance of boring and soils extracted from the borehole may be tested periodically during the installation to verify that the proper drilling fluid mix and additives are being used as well as a concentration of reactant in the fluid, if desired. Water may be checked and adjusted for pH and the presence of calcium. Generally, drilling fluid, which carries soils from down-hole, should exit the hole at the entry or exit end of the installation. Drilling fluid flow provides visual verification that the hole is open and that the fluids are not inadvertently escaping. Field tests that measure the drilling fluids viscosity and weight can help determine the need to adjust drilling fluid mix and the rate at which a product can be safely installed.

Other methods of drilling, as are known by persons having ordinary skill in the art, may be used to install the PRB of the present disclosure. In at least one embodiment of the present disclosure, a first borehole is made with a portion longitudinally extending substantially parallel with an upper surface of a groundwater plume to be treated with a PRB. A second borehole is then made having a portion proximate, substantially adjacent or overlapping the longitudinally extending portion of the first bore hole. Advantageously, the first and second boreholes have a portion longitudinally extending substantially parallel with an upper surface of a groundwater plume, substantially vertically aligned, and substantially adjacent with one another. Horizontal directional drilling may provide for sufficient directional capabilities, but deviations from a desired direction or path are expected. Therefore, the terms substantially parallel, substantially vertically aligned, and substantially adjacent mean that portions are parallel within acceptable tolerances, vertically aligned within acceptable tolerances, and adjacent within acceptable tolerances. Additional boreholes are made to form a plurality of substantially vertically aligned and substantially adjacent, or overlapping portions to form a PRB.

A slotted, perforated, porous, permeable, or otherwise configured to permit the flow of water through a circumferential wall, tube, casing, or pipe may then be pulled or otherwise inserted into the first borehole. The tube or pipe may be inserted into a portion of the borehole having a desired angle and/or length, or desired portion of the borehole to become a part of the PRB. The portion of the borehole desired to become a part of the PRB may then be filled with a reactive material comprising a solid reactant. The tube or pipe may not be necessary for installation of aspects of the PRB of the present disclosure.

The reactive material comprising a solid reactant can be placed in the borehole in various ways such as, conventionally or via slurry injection into the borehole; placing, pulling, or pushing a pre-packed cross-flow tube, packed with a reactive material comprising a solid reactant, into the borehole; and incorporating the reactive material comprising a solid reactant into the cutting fluid.

Upon installation of a first borehole, a second borehole may made by starting at the same location as the first borehole, thus sharing a common head, and arcing to the desired angle prior to or after the point at which the first borehole began to arc. This second borehole is then directed to have a portion proximate, substantially adjacent or overlapping the longitudinally extending portion of the first borehole to become a part of the PRB. The portion of the second borehole to become a part of the PRB which is proximate, substantially adjacent or overlapping the longitudinally extending portion of the first borehole, may have a slotted, perforated, or otherwise porous or permeable tube or pipe inserted therein and then may be filled with a reactive material comprising a solid reactant. This process may be repeated with a third borehole, fourth borehole, or any number of a plurality of boreholes having a substantially vertically aligned portion, proximate, overlapping, substantially adjacent, or adjacent, to achieve a desired height of the PRB. The height of the PRB may be measured from a lower reactive area associated with a lower most borehole and an upper reactive area associated with an upper most borehole. Advantageously, the height of the PRB is substantially perpendicular to the direction of flow of the groundwater plume being treated.

Aspects of the present disclosure provide a permeable reactive barrier downstream of contaminant source or groundwater plume. The PRB allows contaminated groundwater to permeate or slowly pass therethrough where at least a portion of the contaminants in the groundwater react with a portion of the permeable reactive barrier to produce at least one product having less hazardous characteristics than at least one contaminant in the groundwater.

Aspects of the present disclosure provide a PRB configured as an underground porous or permeable wall with a reactive material that reacts with or otherwise degrades contaminants in groundwater flow. As contaminated water passes through the reactive zone of the PRB, comprising a plurality of boreholes, each having a portion longitudinally extending substantially parallel with an upper surface of the groundwater plume and substantially adjacent or overlapping another longitudinally extending portion of a borehole, at least a portion of the contaminants are chemically degraded to a more desirable state (e.g., less toxic, more readily biodegradable, etc.). PRBs of the present disclosure may be installed as permanent, semi-permanent, removable, or replaceable units across the groundwater flow path of the contaminant plume. PRBs of the present invention may incorporate a funnel-and-gate system with impermeable walls that direct the contaminant plume through a gate to the reactive portion of the PRB.

The solid reactant in the PRB of the present disclosure may comprise a variety of reactants or combination of reactants. The solid reactant may comprise an oxidant or oxidants, a reductant or reductants, one or more reactive materials selected from the group consisting of peroxides, permanganates, persulfates, hypochlorite solutions, ozone, zero valent iron, fluorine, sodium bisulfate, metabisulfide, polysulfide, and any combination thereof. The solid reactant may comprise reactive materials comprising particles substantially encapsulated with an encapsulant. The encapsulant or encapsulate may have a characteristic selected from the group consisting of substantially oleophilic, hydrophobic, siliphilic, hydrocarbon soluble, and combinations thereof.

The solid reactant(s) in PRBs of at least one aspect of the present disclosure may be suspended solid reactant(s) and/or encapsulated reactant(s) and may provide a means for controlling the release and/or distribution of the reactant(s) thus providing a means for targeting a contaminant or controlling the reactivity of the reactant to minimize reaction with naturally occurring elements in the groundwater or other benign constituents, saving or preserving at least a portion of the reactant to react with contaminants.

The controlled release and/or distribution of the reactant(s) may be manipulated via a suspending liquid and/or encapsulating coating which targets contaminants or specific organic compounds in the environmental media being treated. Optionally, the reactant(s) have a coating material thereabout providing suitable protection of the reactant for treating the environmental media without further encapsulation. The reactants may be oxidants, reductants, catalysts, chelants, transition metal amine complexes, combinations thereof, and/or other chemical constituents that effectuate a reaction with the targeted compounds. The reaction between the encapsulated reactant(s) and the targeted organic compounds renders at least a portion of the media being treated to have at least one less hazardous characteristic.

A suspension having reactant(s) may be comprised of reactant particles suspended in a liquid. The liquid may have for example water, emulsifiers, surfactants, and/or other substances as are known in the art to substantially suspend the solid reactant(s) in a suspension or slurry.

The encapsulated reactant of aspects of the present disclosure may have a single reactant contained within a single encapsulant, a plurality of reactants contained within a single encapsulant, or a plurality of reactants contained within a plurality of encapsulants. An outer encapsulant may provide for the targeting characteristic of the encapsulated reactant by masking, protecting, stabilizing, delaying, and/or controlling the release and/or distribution of the reactant(s) contained within. In one aspect, the outer encapsulant is substantially oleophilic (i.e. has a stronger affinity for oils rather than water) which may save the reactant from reacting with water or untargeted constituents in the media being treated. Additionally, the outer encapsulant may be substantially reactive, permeable and/or dissolvable with at least one target compound(s) being remediated. Therefore, when the encapsulated reactant is contacted with or exposed to the contaminants, the coating dissolves, reacts, or absorbs at least one of the targeted compound(s) found in the media and exposes at least one reactant to the targeted compounds where it may react. Optionally, the encapsulated reactants may be placed in suspension or in slurry.

In another aspect of the present invention, a solid reactant may be in slurry and a liquid portion of the slurry may provide for the masking, protecting, stabilizing, delaying, and/or controlling the release and/or distribution of the reactant(s).

An encapsulated reactant may have an organic compound in the outermost encapsulant providing an oleophilic and hydrophobic characteristics. The reactants contained within the encapsulant may be a variety of reactants such as catalysts, chelants, transition metal amine complexes, oxidants, reductants, or other reactants. The encapsulated reactant of the present invention may be used to treat a variety of environmental media having a variety of contaminants.

Different groups of encapsulated reactants having different reactants, different coatings, and/or different outermost encapsulants can be introduced into the same PRB or another PRB arranged upstream or downstream, in the flow of the aquifer, of a first PRB. Such applications may provide a means for effectuating a single reaction or multiple reactions, either in series or parallel toward a desired final media state.

The term water as used herein refers to water in a broad sense and incorporates natural solutes. Water is considered to be a universal solvent and has hardness, metals, and a variety of minerals and salts naturally dissolved and/or ionized therein. Therefore, water includes solutes except for selected contaminants and inerts. The controlled release and/or distribution of the reactant(s) may be manipulated via one or more suspending liquids, coating materials, and/or an encapsulating coating to target contaminants or specific organic compounds in the plume of contamination being treated.

The reactants may comprise oxidants, reductants, catalysts, chelants, transition metal amine complexes, combinations thereof, and/or other constituents that effectuate an initial, intermediate, and/or final reaction with the organic compound(s) being treated.

Typically, in insitu remediation, the media being treated is either water or has water moving within, such as soil. Therefore, reactant(s) in the PRB may be in slurry or have an outer encapsulant that is substantially nonreacting, impermeable and/or nondissolving with water. At the same time, encapsulant or component of the slurry may be soluble, reactive, and/or permeable to at least one of the compound(s) being treated.

An encapsulant may be characterized by having one or more of a plurality of mechanisms for releasing and/or contacting reactant with contaminants in the groundwater. One mechanism in which the encapsulant may expose the reactant to contaminants or even targeted compounds is where a contaminant or targeted organic compound permeates through the encapsulant causing an internal pressure of the encapsulated reactant to reach a level suitable for reverse osmosis, dispersing the reactant to the zone of contamination. A second mechanism involves the encapsulant dissolving and/or rupturing with at least one contaminant or targeted organic compound releasing the encapsulated compounds or reactants to the zone of contamination. Additionally, a "chemical trigger" can be incorporated within an encapsulant to allow for accelerated degradation of the encapsulant and/or release of the reactant upon contact with the contaminants or targeted compound groups being treated. The thickness, permeability, and/or composition of the encapsulant can be adjusted to control the rate at which the contaminants or targeted compound penetrates, dissolves, and/or reacts with the encapsulant thereby distributing and/or diffusing the reactant.

One aspect of the present disclosure comprises a process for making a PRB comprising zero valent iron. Zero valent iron is a reductant which may function to remove chlorinated organic contaminants from the subsurface aquifer by reductively de-chlorinating these species as contaminated groundwater, in the plume, flows through the PRB. Zero valent iron may be effective for remediating other halogenated organic contaminants as well. Additionally, zero valent iron may be effective in remediating heavy metals in groundwater.

Alternatively or additionally, reactant(s) made by the process of the present invention may be placed in a suspension. The reactant(s) may be un-encapsulated or encapsulated. The suspending liquid can be any liquid known in the art that provides for a suspension of solid reactant(s) in an environment to be treated and has a low oxidation or reduction potential with the reactant(s).

The suspended, coated and/or encapsulated reactant(s) described herein may be produced by first grinding or comminution: media milling (ball milling, batch milling, attritor milling, wet or dry processing, etc.); medialess milling (hammer mills, cryogenic hammer mills, jet milling, jaw crushing, high pressure dispersion milling, microfluidization, etc.); screening and/or sieving; air classification, etc. the reactant(s). The reactant(s) may then be encapsulated or coated by spray drying and prilling; dry powder coating; melt coating, deposition, etc. Alternatively, the reactant(s) are milled in the presence of at least one coating material to reduce reagglomeration of the reactant(s) during milling. Optionally, the at least one coating material provides a suitable coating of the reactant(s) for use in treating the environmental media without further coating or encapsulation. The encapsulated or un-encapsulated reactant(s) may be placed in suspension or in slurry prior to placing into the environment to be treated.

In at least one embodiment of the instant disclosure, at least one solid reactant is contained within a solid coating or encapsulating material such as a wax. For example, solid blocks, slabs, or other shaped masses of encapsulating material(s) and reactant(s) may be placed into the boreholes. These masses may be size reduced, by chipping, for example, prior to feeding into a borehole. These chips or reduced sized masses of encapsulating material(s) and reactant(s) may be put into a suspension, allowing them to flow into the borehole.

In at least one other embodiment, sheets or slabs of encapsulating material(s) and reactant(s) may be substantially impermeable to the flowing groundwater and may be placed directly into the subsurface to divert the flow of the groundwater to a PRB. For example, in a funnel and gate system, as is known in the art, the funnels may comprise sheets or slabs of encapsulating material(s) and reactant(s) and the gate may comprise a PRB.

Certain exemplary embodiments can provide a treatment technique for any and/or all of the above listed chemical contaminant(s) within a variety of medias and/or subterranean environments comprising: silts, clays, sands, fractured bedrock, karsts, organics, and/or tills. Via certain exemplary embodiments, in situ environmental remediation within subsurface bedrock and/or fractured bedrock networks can be greatly increased due to the above mentioned adjustable properties of the particle and/or aqueous mixture.

A PRB may be installed down flow of a plume of contamination in the aquifer and filled with a reactive material comprising at least one solid reactant. In this application, the reactant(s) may be pure or substantially pure, in a suspending liquid, coated, and/or have an outer encapsulant. The suspending liquid, coating, and/or encapsulant may be designed to remain un-reacted or intact for an extended period of time (e.g. years) and as the plume of contamination passes through the PRB, the encapsulant may allow targeted constituents to react with the reactant(s). A reactive oxidant may be kept segregated from a metallic salt(s), chelate(s), and/or buffering agent(s) by internal encapsulation, hence deferring any intermediate reaction there between. Once the desired time or condition of exposure to an aqueous environment has elapsed and/or a "triggered" exposure to the contaminant(s) of concern has occurred, an outer encapsulant can release the oxidant into the presence of the metallic salt(s), chelate(s), and/or buffering agent(s), allowing any intermediate reaction there between to occur, and thereby resulting in the production of oxidizing free radicals, hydroxyl radicals, sulfate radicals, or the like possibly by virtue of a mimicked Fenton's reaction. The radicals can undergo a final reaction with the contaminant(s) of concern, oxidizing the contaminant compound(s) (typically exothermically), often times into final products of carbon dioxide and water.

The method of using products made by the method of the present invention may utilize a combination of one or more reactants. The reactant(s) may be applied directly, suspended, coated, and/or encapsulated. The reactant(s) may comprise oxidant(s), reductant(s), metallic salt catalyst(s), and/or chelating agent(s) under conditions which enable oxidation or reduction of most, and preferably substantially all, volatile, semi-volatile, or non-volatile organic and/or inorganic compounds such as heavy metals in soil, rock, sludge, water, groundwater, and/or wastewater rendering them less harmful.

In one embodiment of the present invention, a combination of oxidant(s) (a persulfate group—potassium or sodium), catalyst(s) (iron salt), and chelating compound(s) (EDTA), encapsulated or unencapsulated, are placed into a PRB simultaneously within an aqueous mixture, slurry, or suspension. For instance, a combination of suspended reactant(s), may include a first group of suspended, free, coated, and/or encapsulated reactants having persulfate and a second group of suspended, free, coated and/or encapsulated reactants having ferrous sulfate. The suspended, free, coated and/or encapsulated reactants may remain substantially unreactive within the subsurface until contact with a contaminant occurs. Upon contact, the suspending liquids, coatings, and/or encapsulants about the reactants may begin to degrade, weaken, or become more permeable until the reactant contacts the contaminant(s). The oxidant and/or catalyst and/or chelating agent react independently or in combination, resulting ultimately in the partial or complete oxidation of the contaminant(s). The final by-products of the oxidation reaction are typically carbon dioxide, water, a salt group (depending on oxidant of choice), and an inorganic chloride ion (if contaminant is chlorinated).

In at least one embodiment of the present invention, a reduced size reactant particle, un-encapsulated or encapsulated, are placed in suspension or slurry, several advantages may be realized. The slurries or suspensions of the reduced sized reactant particles may serve to overcome a low solubility of the reactant(s). For example, the PRB may be filled with a concentrated suspension or slurry, thereby minimizing the total fluid volume required for treatment application. For example, potassium permanganate has a solubility of about 4% by weight in water. The concentration of the reactant(s) in the slurry may be increased by using different suspending fluids or by adding surfactants, emulsifiers, or polymeric materials to water to form a suspending liquid, for example. The concentration of the reactant in suspension may be increased to 25%, 50%, or even more. This increase in reactant concentration in suspension may reduce the volume of the PRB and the volume of the suspension to be injected or placed in the in situ environment.

In at least one embodiment of the present invention, a reactant having sodium persulfate and optionally a catalyst, e.g. one or more metallic salts, may be contained within an encapsulant having cellulose, wax, polylactic acid, or combinations or derivatives thereof. Such an embodiment may provide persistence of the reactant(s) in water until the encapsulated reactants encounter contaminants at which point the reactant(s) break down at least one contaminant rendering it less harmful.

The outer coating and/or encapsulant surrounding the reactant(s) may be designed to delay the chemical reaction between reactant and targeted contaminant(s) to allow for an extended coverage area and/or time when applied to subsurface treatment. Additionally, the size of the encapsulated reactant can be preselected to allow for less restricted flow through the subterranean environment, and thereby can provide for extended coverage areas and/or reduced loading restrictions.

Another aspect of the present invention uses reduced sized reactant particles. A coating material that is advantageously substantially oleophilic, hydrophobic, siliphilic, hydrocarbon soluble, or exhibits a combination of these properties, the coating material continuously substantially coats the oxidant particles. The particles may advantageously have a mean diameter of at most 100 μm, more advantageously of at most 10 μm, even more advantageously at most 5 μm, and most advantageously at most 1 μm.

Yet another aspect of the present invention uses larger sized reactant particles and/or larger sized encapsulating or coating material containing a plurality of larger or reduced sized solid reactant particles. For example, a coating material, such as a wax, may be of a large mass and may comprise a plurality of reactant particles. The reactant particles may have a mean diameter greater than or less than 100 μm. The coating material comprising the reactant may be reduced in size, chipping for example, and placed in suspension prior to injecting into the borehole.

A coating material or component of a suspension may be an oil or wax and may be derived from animals, hydrocarbons, vegetables, silicones, or any combinations thereof. For example, the coating material may be a wax such as paraffin. Optionally, a coating material is a combination of oils, waxes, or oils and waxes. The small particle size of the oxidant particles may make them suitable for holding in a suspension that may be applied directly into the environment to be treated. The optionally provided substantially hydrophobic and substantially oleophilic outer encapsulant in the encapsulated reactants of embodiments of the instant invention may provide a means to control the release of reactant(s) until contact occurs with the targeted contaminants. This may provide a highly efficient contaminant destruction ratio using lesser amounts of oxidant(s), catalyst(s), chelating agents and/or other reactants. Areas of influence, both horizontally and vertically, from point of application or injection may be increased. The reactants may provide more capability of controlling the reactant's path of travel or distance since the properties of the coating material, suspending fluid, and/or outer encapsulant may be modified. The reactant's size, surface area, buoyancy, specific gravity, density, etc. may be manipulated to engineer encapsulated reactant(s) to float, suspend, or sink within the subsurface providing an increased means of reaching targeted contaminants.

FIG. 1 shows directional drill rig 10 and a portion of a permeable reactive barrier 29 made therewith. Directional drill rig 10 is positioned upon soil surface 12 at a desired angle of incidence of a drill head. Directly below soil surface 12 is a vadose zone 24, which is an unsaturated zone extending from soil surface 12 to aquifer 16. Between aquifer 16 and vadose zone 24 may be a partially saturated zone 26 that may become substantially saturated from the rising and lowering of the water table or aquifer 16 and/or through capillary action.

In at least one embodiment, PRB 29 is in a plane substantially perpendicular to the direction of flow of water in aquifer 16. PRB 29 may be made by drilling or cutting into soil 24 at well head 20. Drilling may be continued at an angle proximate to an angle of entry until the borehole becomes proximate a contamination plume where it may be leveled off or arced to become substantially parallel to surface 28 of aquifer 16. This area of contamination is generally designated with vertical line "A" and extending in the direction designated with "B". The zone designated as 18 is below the area of aquifer 16 to be treated with PRB 29. Zone 18 may be bedrock, an area of aquifer 16 having a lower flow rate, an area of aquifer 16 having a low concentration of contamination, or an area of aquifer 16 that is not be treated with PRB 29.

Upon becoming proximate the plume of contamination to be treated, designated generally with "A" and "B", the borehole is substantially leveled off to make a portion longitudinally extending substantially parallel with an upper surface 28 of the groundwater plume, as designated by 22(a)-22(i). In at least one embodiment, each longitudinally portion of each bore hole, 22(a)-22(i), is formed by drilling through a common well head 20. For example, a first borehole having longitudinal portion 22(a) may be made and the drill head may be retracted to the portion of the drill head 23 having each borehole 22(a)-22(i) extending therefrom. A second borehole may then arc away from longitudinal portion 22(a) to form longitudinal portion 22(b). This process may be repeated for each portion, 22(a)-22(i), longitudinally extending substantially parallel with upper surface 28 of the groundwater plume 16, until a desired height of PRB 29 is obtained. In at least one embodiment of the present disclosure, boreholes 22(a)-22(i) are substantially adjacent or adjacent within acceptable tolerances. In at least one other embodiment of the present disclosure, boreholes 22(a)-22(i) are substantially vertically aligned or vertically aligned within acceptable tolerances.

Figure 2A:
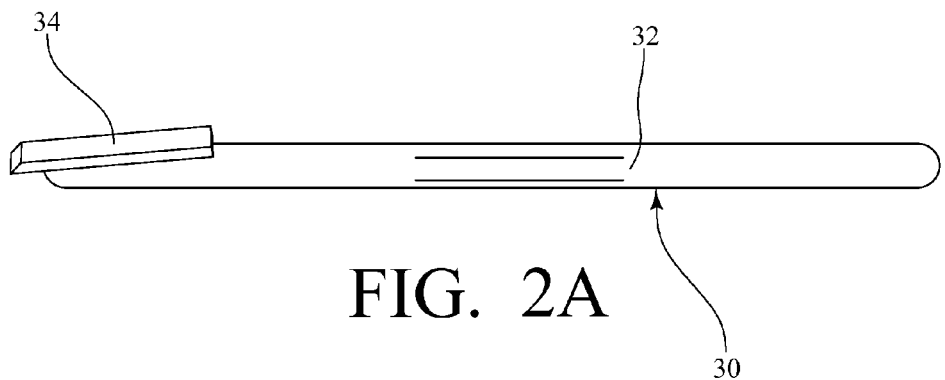
FIG. 2A is a side view of a duckbill drill head.
Figure 2B:
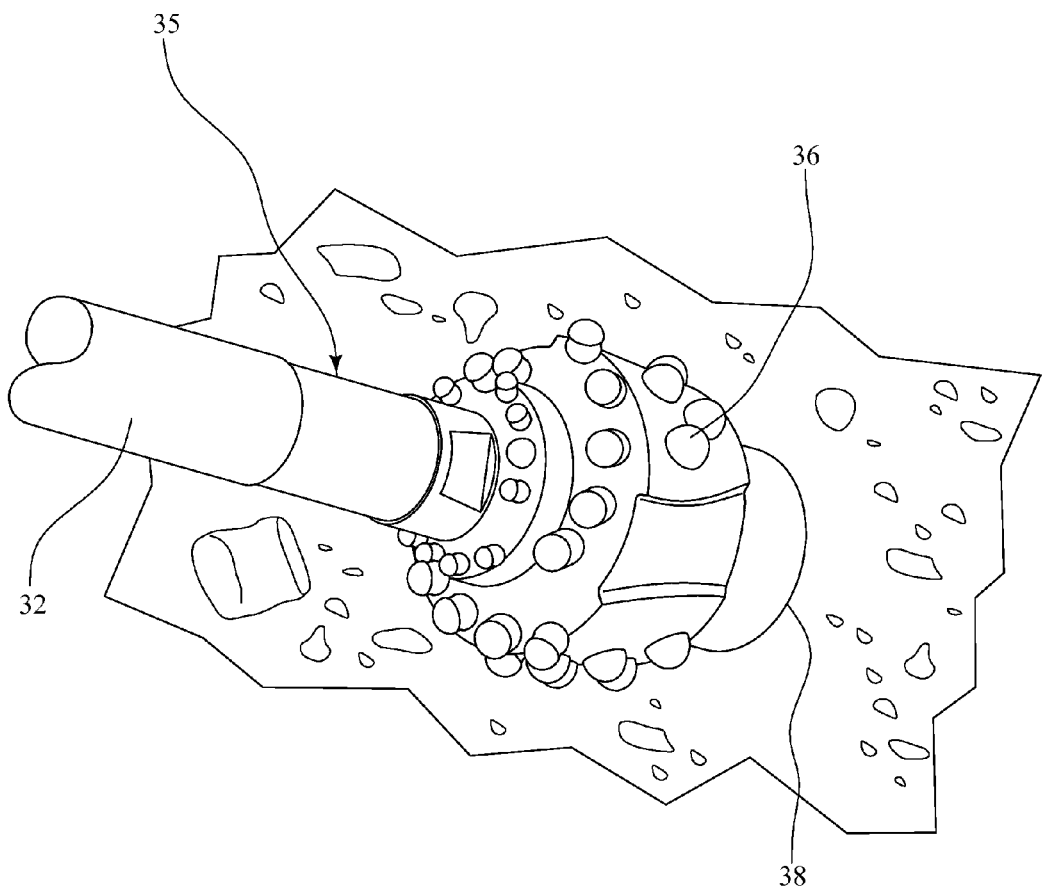
FIG. 2B is a side view of a rotary drill head.

FIGS. 2A and 2B show examples of drill heads that may be used in at least one embodiment of the present disclosure. FIG. 2A shows a duckbill drill head 30 having duckbill 34 angularly extending from an end of drill rod 32. FIG. 2B shows a rotary drill head 35 having protrusions 36 extending outward from a conical end. Drill head 35 may have an open end 38 for the flow of drilling or cutting fluids. Protrusions 36 and/or the end of drill head 35 about open end 38 may be designed for cutting soil or rock.

Some examples of permeable reactive barriers, which may be used or adapted for use in at least one possible embodiment of the present disclosure, may be found in the following U.S. patents: U.S. Pat. No. 6,254,786 to Carpenter et al., U.S. Pat. No. 6,428,695 to Naftz et al., and U.S. Pat. No. 7,217,755 to Harrup, Mason K.

Some examples of reactants, which may be used or adapted for use in at least one possible embodiment of the present disclosure, may be found in the following U.S. Patents and Publications: US20080275288 to Swearengin et al., U.S. Pat. No. 7,431,849 to Swearengin et al., and US20090061082 to Swearengin et al.

The purpose of incorporating U.S. patents, foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The invention claimed is:

1. A process for insitu treatment of at least one contaminant in a groundwater plume, the process comprises the steps of:
   installing a permeable reactive barrier in the flow path of the groundwater plume, wherein the installation of the permeable reactive barrier comprises the steps of:
      boring a first borehole with a portion longitudinally extending substantially parallel with an upper surface of the groundwater plume;
      filling the longitudinally extending portion of the first borehole with a reactive material comprising a solid reactant configured to react with the at least one contaminant in the groundwater plume to produce at least one product having less hazardous characteristics than the at least one contaminant;
      boring a second borehole with a portion substantially adjacent or overlapping the longitudinally extending portion of the first borehole;
      said first borehole and said second borehole having a common head; and
      filling the portion of the second borehole substantially adjacent the longitudinally extending portion of the first borehole with the reactive material; passing at least a portion of the groundwater plume having the at least one contaminant through a portion of the permeable reactive barrier; and
   reacting at least a portion of the at least one contaminant with a portion of the permeable reactive barrier to produce at least one product having less hazardous characteristics than the at least one contaminant.

2. The process for insitu treatment of at least one contaminant in a groundwater plume of claim 1 wherein said solid reactant of said reactive material is an oxidant or a reductant.

3. The process for insitu treatment of at least one contaminant in a groundwater plume of claim 2 wherein said solid reactant of said reactive material is selected from the group consisting of peroxides, permanganates, persulfates, hypochlorite solutions, ozone, zero valent iron, fluorine, sodium bisulfate, metabisulfide, polysulfides, and combinations thereof.

4. The process for insitu treatment of at least one contaminant in a groundwater plume of claim 1 wherein said solid reactant of said reactive material comprises particles substantially encapsulated with an encapsulant having a characteristic selected from the group consisting of substantially oleophilic, hydrophobic, siliphilic, hydrocarbon soluble, and combinations thereof.

5. The process for insitu treatment of at least one contaminant in a groundwater plume of claim 1 wherein said steps of boring said first and said second boreholes comprises boring with a drill head having a duckbill attached thereto.

6. The process for insitu treatment of at least one contaminant in a groundwater plume of claim 1 wherein said steps of boring said first and said second boreholes comprises boring with a slurry comprising said reactive material.

7. The process for insitu treatment of at least one contaminant in a groundwater plume of claim 1 wherein said steps of boring said first and said second boreholes comprise water jetting with said slurry comprising said reactive material.

8. The process for insitu treatment of at least one contaminant in a groundwater plume of claim 1 wherein said step of filling the longitudinally extending portion of the first borehole with a reactive material and said step of filling the portion of the second borehole substantially adjacent the longitudinally extending portion of the first borehole with the reactive material, comprise inserting a tube or pipe configured to permit flow of water through a circumferential surface thereof, said tube or pipe containing said reactive material.

9. A process for the installation of a permeable reactive barrier comprising the steps of:
   drilling a borehole head with a drill bit on a directional drill rig, the directional drill rig being configured to provide a change in direction in a borehole;
   changing the direction of the drilling at a first point in the borehole head and providing a portion of a first borehole that is substantially parallel with an upper surface of an aquifer;
   retracting the drill bit to the borehole head;
   changing the direction of the drilling at a second point in the borehole head, above or below the first point in the borehole head, and providing a portion of a second borehole extending proximate with and above or below the portion of the first borehole that is substantially parallel with an upper surface of an aquifer; and feeding a solid reactant into the portion of the first borehole that is substantially parallel with an upper surface of an aquifer and the portion of the second borehole extending proximate with and above or below the portion of the first borehole that is substantially parallel with an upper surface of an aquifer.

10. The process for the installation of a permeable reactive bather of claim 9 further comprising of:
retracting the drill bit to the borehole head;
changing the direction of the drilling at a third point in the borehole head, above or below the second point in the borehole head, and providing a portion of a third borehole extending proximate with and above or below the portion of the second borehole that is proximate with a portion of the first borehole; and
feeding a solid reactant into the portion of the third borehole that is extending proximate with and above or below the portion of the second borehole.

11. The process for the installation of a permeable reactive barrier of claim 9 wherein the directional drill rig is placed upon the surface of the soil prior to drilling.

12. The process for the installation of a permeable reactive barrier of claim 9 wherein said solid reactant comprises at least one reactant selected from the group consisting of peroxides, permanganates, persulfates, hypochlorite solutions, ozone, zero valent iron, fluorine, sodium bisulfate, metabisulfide, polysulfides, and combinations thereof.

13. The process for the installation of a permeable reactive barrier of claim 9 wherein the directional drill rig bit comprises a duckbill.

14. The process for the installation of a permeable reactive barrier of claim 9 wherein the directional drill rig comprises a sonde or transmitter located behind the drill bit, the sonde or transmitter being configured to report the angle, rotation, and direction of the drill bit to a directional drill rig operator.

* * * * *